United States Patent Office 3,485,617
Patented Dec. 23, 1969

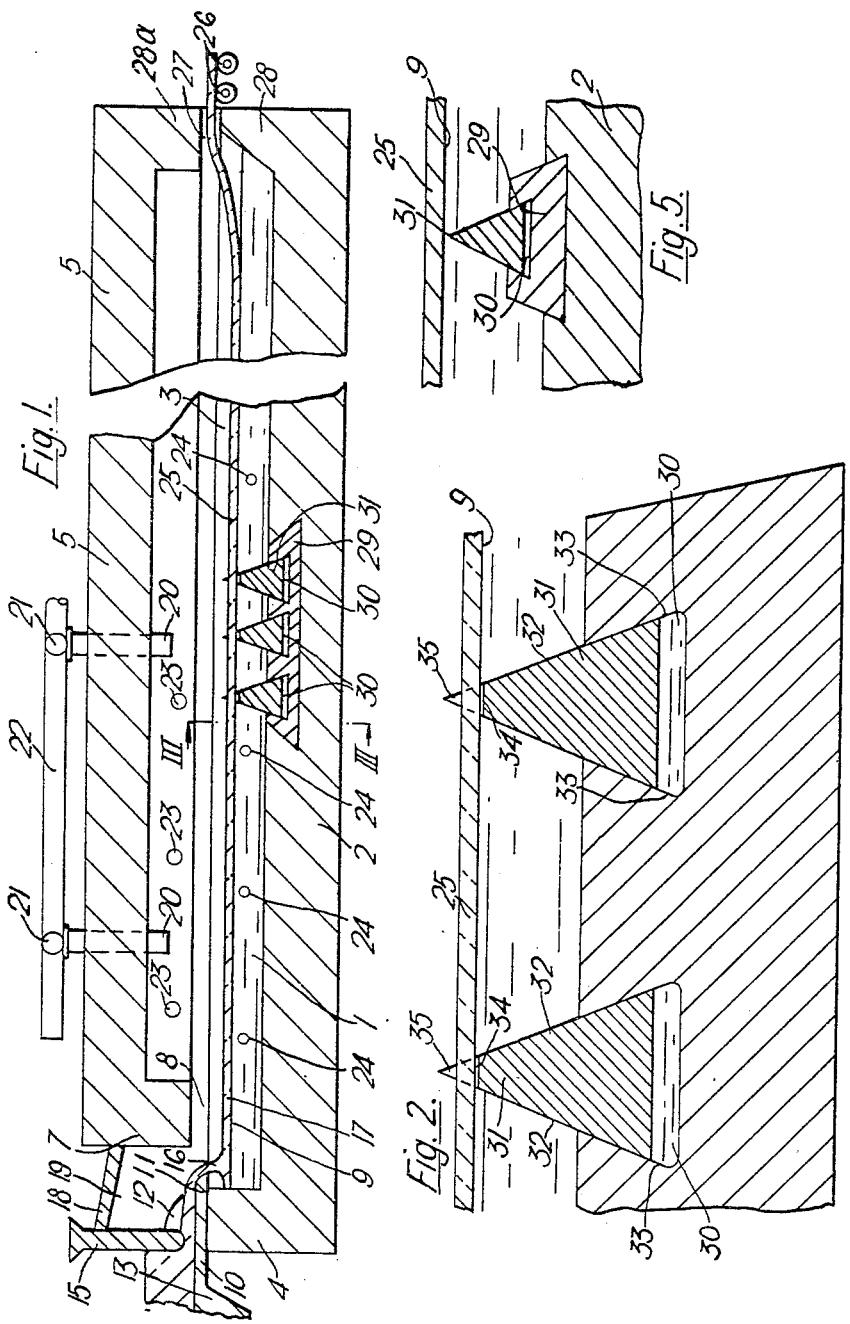

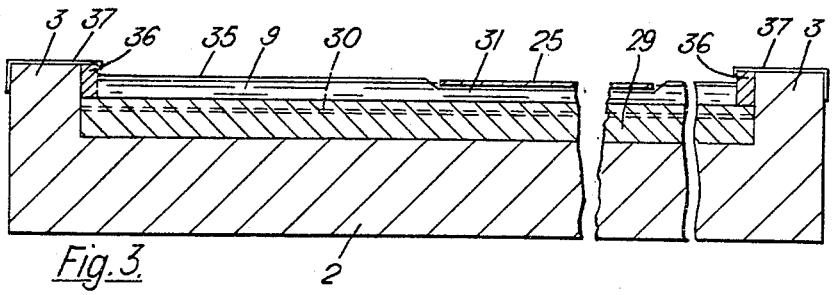
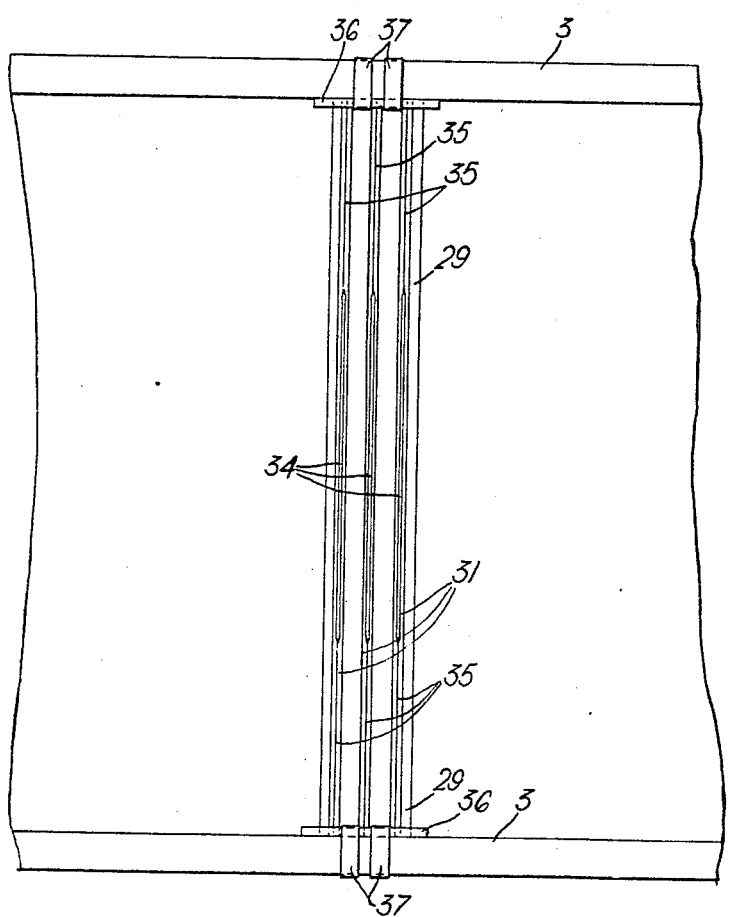

3,485,617
APPARATUS FOR THE MANUFACTURE OF FLOAT GLASS UTILIZING BUOYANT DEPRESSIBLE BARRIER MEANS
Jack Lawrenson, Windle, St. Helens, England, assignor to Pilkington Brothers Limited, Liverpool, England, a corporation of Great Britain
Filed Nov. 15, 1966, Ser. No. 594,424
Claims priority, application Great Britain, Nov. 19, 1965, 49,342/65
Int. Cl. C03b 18/00
U.S. Cl. 65—182    5 Claims

ABSTRACT OF THE DISCLOSURE

An apparatus for the manufacture of flat glass by advancing it over a molten metal bath in ribbon form contains one or more buoyant upwardly projecting barriers for obstructing the longitudinal flow of molten metal in the bath, which barriers are easily depressible by the advancing glass if touched thereby and which barriers also project through the exposed bath surface at the sides of the glass ribbon.

---

This invention relates to the manufacture of flat glass and more especially to methods and apparatus for the manufacture of flat glass during which glass in ribbon form is advanced along a bath of molten metal and is thermally conditioned as it is advanced prior to discharge from the bath.

The bath of molten metal may be a bath of molten tin, or of a molten tin alloy in which tin predominates and which is of greater specific gravity than that of the glass, and preferably the bath is so constituted as to have all the characteristics fully described in U.S.A. Patent No. 2,911,759.

It is usual to provide temperature regulators in a headspace defined over the bath of molten metal as well as in the bath itself in order to effect the desired thermal conditioning of the ribbon of glass as it is advanced along the bath of molten metal. Zones of the headspace have been defined by means of refractory partitions in order to localise the temperature control of the ribbon of glass by heat exchange between the advancing ribbon of glass and the headspace over the bath.

It is a main object of the present invention to provide an improvement in the localised treatment of a ribbon of glass advancing along a bath of molten metal.

According to the invention there is provided a method of manufacturing flat glass including an elongated tank structure containing a bath of molten metal, a roof structure bridging the tank structure and means for delivering glass at a controlled rate to one end of the bath and advancing the glass along the bath in ribbon form for discharge through an outlet from the bath, including, mounted in the floor of the tank structure, a buoyant, depressible barrier to flows of molten metal in the bath, which barrier projects upwardly in the bath to the vicinity of the surface of the bath.

A temperature gradient is usually established down the bath from the hot end of the bath where glass is delivered to the bath to the cooler outlet end of the bath which the glass reaches when it has become sufficiently stiffened to be taken unharmed from the bath of molten metal. There is a tendency for molten metal to flow at the surface of the bath with the glass towards the outlet end of the bath with the result that there is a return flow of cooled molten metal along the bottom of the bath towards the hot end of the bath.

Temperature regulators are located in the bath and are spaced apart longitudinally of the bath, and the effect of these regulators militates against a bottom flow of cooled molten tin reaching the hot end of the bath, but the provision according to the invention of one or more barriers for obstructing the flows of molten metal in the bath, for example longitudinal flows, enables more accurate and localised treatment of the glass on the bath to be achieved, more especially at the hot end of the bath where in some processes a layer of molten glass is established on the bath and lateral flow of the glass in the layer is permitted under the influence of surface tension and gravity in order to develop a buoyant body of molten glass which is thereafter advanced in ribbon form along the bath.

In a preferred embodiment of the invention the barrier comprises a seating member inset into the floor of the tank structure and formed with at least one dovetail groove, and a bar whose cross-section is of triangular form and which is made of a material of lower specific gravity than that of the molten metal bath is located in the groove, the dimensions of the bar relative to the groove being such that the bar floats in but is retained in the groove.

In that part of the bath directly underneath the path of the ribbon of glass the barrier must not project upwardly as far as the surface of the molten metal. In some applications of the invention sufficient obstruction of a return flow of cooled molten metal may be achieved by providing for the whole of the barrier to reach up to within a prescribed distance of the surface of the bath. More positive obstruction of molten metal flows may, however, be achieved by preventing surface flow of the molten metal of the bath in the exposed strips of molten metal alongside the path of travel of the ribbon, it being usual for the surface width of the bath to be greater than the width of the ribbon of glass produced on the bath. From this aspect the top of the barrier may project through the exposed bath surface alongside the path of travel of the ribbon of glass.

Because the bar floats in the groove in the seating member on the molten metal which enters this groove, the bar can be easily depressed by the moving glass if it touches the top of the barrier. The bar would immediately sink into the groove and so would not interfere with the forward advance of the ribbon of glass.

The bar may be of truncated triangular form underneath the path of travel of the glass, while the apex of the triangular bar projects through the surface of the molten metal at the sides of the path of travel of the glass. Thus, the bar extending transversely across the bath of molten metal is in effect of triangular cross-section but with a cut-out portion which lies underneath the path of travel of the ribbon of glass, leaving a definite space between the top of the cut-out portion and the under-surface of the glass being advanced along the bath.

A single bar as described above may provide an adequate barrier to flows of molten metal in the bath, but further according to the invention the effect of the barrier may be enhanced by employing more than one bar. In a preferred embodiment the barrier comprises three bars floating side-by-side in three parallel dovetail grooves formed in the seating member inset in the floor of the tank structure.

The invention also comprehends apparatus for use in the manufacture of flat glass including an elongated tank structure containing a bath of molten metal, and characterised by two transverse barriers to flows of molten metal in the bath, which barriers are spaced apart longitudinally of the bath to define a region for localised treatment of the advancing ribbon of glass.

In order that the invention may be more clearly understood some embodiments thereof will now be described, by way of example, with reference to the accompanying drawings in which:

FIG. 1 is a sectional elevation through the inlet end of a tank structure containing a bath of molten metal and including a barrier according to the invention, FIG. 2 is an enlarged view of a part of the barrier of FIG. 1, FIG. 3 is a section on line III—III of FIG. 1, FIG. 4 is a plan view of the tank structure of the apparatus of FIG. 1 omitting the roof structure and showing that part of the bath in which the barrier according to the invention is located, and FIG. 5 is a section through an alternative arrangement of a barrier according to the invention shown mounted in the floor of a tank structure.

Referring to the drawings, apparatus for manufacturing flat glass in ribbon form comprises a tank structure containing a bath 1 of molten metal, for example molten tin or a molten alloy of tin in which tin predominates and which has a greater specific gravity than that of the glass. The tank structure comprises a floor 2, side walls 3 and an end wall 4 at the inlet end of the bath, which end wall 4 is integral with the floor 2 and the side walls 3. A roof structure is supported over the tank structure and defines a tunnel-like headspace over the bath. The roof structure comprises a roof 5, side walls 6 and an end wall 7 at the inlet end of the bath which is illustrated in FIG. 1. There is an inlet 8 defined between the bottom of the end wall 7 of the roof structure and the surface 9 of the bath of molten metal.

A spout 10 is supported over the end wall 4 of the tank structure, which spout is of generally rectangular cross-section as defined by a lip 11 and side jambs 12. The spout 10 forms an extension of a forehearth 13 of a glass melting furnace and a head of molten glass 14 is held on the forehearth 13 by a regulating tweel 15. Molten glass flows under the tweel 15 and falls from the spout as indicated at 16 on to the surface 9 of the bath of molten metal in order to establish a layer 17 of molten glass on the bath, which layer is advanced along the bath through the inlet 8 in ribbon form. The spout is housed in a chamber defined by a cover 18 extending between the tweel 15 and the end wall 7 of the roof structure and side walls 19.

Ducts 20 extend through the roof 5 into the headspace over the bath and are connected by headers 21 to a main duct 22 which supplies protective gas to the headspace, which protective gas is maintained at a plenum in the headspace. Temperature regulators 23 are mounted in the headspace over the bath and temperature regulators 24 are mounted in the bath to control the thermal condition of the glass as it is advanced in ribbon form along the bath as indicated at 25. The temperature gradient down the bath is such that by the time the ribbon 25 reaches the outlet end of the bath it is stiffened sufficiently to be taken unharmed from the bath by conveyor rollers 26 mounted beyond an outlet 27 from the bath, which is defined between the top of the outlet end wall 28 of the tank structure and the outlet end wall 28a of the roof structure.

At the outlet end of the bath the temperature of the bath and of the glass may be in the region of 650° C., whereas at the inlet end of the bath the temperature may be in the region of 1000° C. There is induced by the advancing of the ribbon of glass along the bath a surface flow of the molten metal down the bath and a consequential return flow of cooled molten metal takes place from the outlet end of the bath along the bottom of the bath towards the inlet end.

The glass delivered to the bath at the inlet end establishes a layer of molten glass on the bath, and this layer may be permitted to flow laterally under the influence of surface tension and gravity. During this lateral flow accurate control of the glass is desirable for example accurate temperature control, and in order to assist such accurate control the invention provides for obstructing flow of molten metal in the bath in a direction contrary to the direction of advance of the ribbon of glass. To this end the floor 2 of the tank structure comprises at a prescribed distance from the inlet end wall 4 a transverse barrier, extending in the embodiment illustrated right across the whole width of the glass, to longitudinal flows of molten metal in the bath. The barrier projects upwardly in the bath to the vicinity of the surface 9 of the bath and so obstructs the flow of cold molten metal into the region of the inlet end of the bath.

The barrier comprises a seating member 29 of a refractory material, for example carbon, which is inset into the refractory floor 2 of the tank and extends right across the tank structure as shown in FIG. 3. The top surface of the seating member is level with the top of the floor of the bath, and in this seating member there are formed three dovetail grooves 30 extending right across the tank structure. In each of the grooves there is held a bar 31 whose cross-section is of triangular form and which is made of a material, for example carbon, of lower specific gravity than that of the molten metal of the bath 1.

As shown in FIG. 2 the width of the base of each bar 31 is less than the width of the bottom of the groove 30 in which the bar is located. The slope of the sides 32 of each bar 31 matches the slope of the inner faces 33 of the dovetail grooves 30. Each of the bars 31 floats on the molten metal in its groove but is retained in the groove by engagement of its sloping surfaces 32 with the cooperating surfaces 33 of the groove, in such a position that the top 34 of each bar 31 lies near to the surface of the molten metal under the path of the ribbon of glass 25.

Along that part of each bar 31 which is situated underneath the path of travel of the ribbon of glass 25 the triangular cross-section of the bar is truncated leaving a flat horizontal top surface as indicated at 34 in FIG. 2, and this flat top surface 34 is parallel to the underface of the ribbon of glass 25, but lies in short distance underneath the ribbon so that except in accidental circumstances the ribbon does not touch the bar 31. The flow of molten metal entrained by the glass is thus considerably reduced.

The truncated part of the bar 31, as shown in FIG. 3, is that part of the bar lying underneath the path of travel of the ribbon. At the sides of the path of travel of the glass the triangular bar 31 is not truncated and the apex 35 of the bar projects through and above the surface 9 of the bath of molten metal. There is thus complete obstruction at the sides of the bath of any upstream flow of molten metal from the cooler outlet end of the bath.

The inset 29 in the floor 2 of the tank structure is held in position by being dovetailed into the floor and by carbon blocks 36 which are held down on top of the ends of the inset 29 by angle irons 37 fixed through and over the side walls 3 of the tank structure. Provision is made for inserting the bars 31 into their grooves by sliding the bars in through one side wall of the tank structure.

One transverse bar 31 may provide an adequate barrier to the contra-flow of cooled molten metal, but in the embodiment which is illustrated the barrier effect is enhanced by the provision of three parallel bars 31 floating side-by-side in three parallel dovetail grooves 30 formed in the seating member 39. Carbon is used for the bars 31 because it is a material which is not wetted by molten glass, and if the ribbon of glass 25 is still hot as it passes over the barrier and should happen to touch the top surface 34 of one or more of the bars, the glass slides over the carbon surfaces of the bars 31 which are depressed by the glass. This safeguards the process to the extent that even if the ribbon of glass accidentally contacts one of the bars 31 the forward advance of the ribbon of glass is not interfered with.

If desired the bars 31 may not extend right across the bath, and may be adjustable in the seating member 29. An alternative way of mounting one bar 31 in the floor of the tank structure is illustrated in FIG. 5. The seating member 29 stands proud of the floor 2 of the tank structure and the height of the carbon bar 31 is less than in the embodiment of FIGS. 1 to 4. This mounting may be used for a three-bar barrier of the kind illustrated in FIGS. 1 to 4.

The barrier is illustrated in FIGS. 1 to 4 as located at a predetermined distance from the inlet end of the bath of molten metal for the particular purpose of preventing molten tin from flowing upstream into the region of the inlet end of the bath. One or more barriers according to the invention may be employed as desired anywhere along the tank structure to assist in defining the beginning and end of a particular zone of the bath where localised treatment of the advancing glass is being effected. For example, it may be desired to maintain the viscosity of the ribbon of glass constant over a predetermined length of the advancing ribbon and apart from the use of partitions to divide the headspace over the bath and so provide a heating zone in the headspace, the invention may be employed to provide complementary barriers in the bath of molten metal and so segregate thermally the zone of the bath in which more accurate temperature control of the heat exchange between the molten metal and the advancing ribbon of glass can be achieved.

I claim:
1. Apparatus for use in the manufacture of flat glass including, in combination, an elongated tank structure of given width containing a bath of molten metal, a roof structure bridging the tank structure, means for delivering glass at a controlled rate to the bath at an inlet end, means for advancing the glass along the bath in ribbon form of lesser width for discharge through an outlet end, and barrier means for obstructing the flow of molten metal in the bath in a direction longitudinally of the bath said barrier means comprising a seating member inset into the floor of the tank structure, an upwardly projecting barrier element not wetted by molten glass and extending completely across the width of the tank structure and being bouyant in the metal of the bath disposed in said seating member in a floating condition and retained thereby, the top portion of said barrier directly underneath said glass ribbon being normally in spaced relation with the under surface of the glass as it advances along the bath and the top portion of said barrier at the sides of said glass ribbon projecting through the exposed bath surface, said barrier element being easily depressible so as not to interfere with the advance movement of the glass in the event the glass touches the top of said barrier element.

2. Apparatus according to claim 1 wherein the barrier means for obstructing the flow of metal in the bath comprises a plurality of barrier elements disposed transversely to flows of molten metal in the bath and spaced apart longitudinally of the bath to define a region for localized treatment of the advancing ribbon of glass.

3. Apparatus according to claim 1 wherein the seating member comprises at least one dovetail groove and the barrier element is in the form of a bar located in the groove and is of triangular cross-section with dimension enabling it to float in the groove, said bar being made of a material of lower specific gravity than the molten metal bath.

4. Apparatus according to claim 3 wherein the triangular bar is truncated underneath the path of travel of the glass, and has an apex projecting through the exposed surfaces of the molten metal at the sides of the path of travel of the glass.

5. Apparatus according to claim 4, wherein the barrier means comprises three bars floating side-by-side in three parallel dovetail grooves formed in the seating member inset in the floor of the tank structure.

References Cited

UNITED STATES PATENTS

| 3,393,061 | 7/1968 | Greenler et al. | 65—182 |
| 789,911 | 5/1905 | Hitchcock | 65—182 |
| 2,035,272 | 3/1936 | Mambourg | 65—342 |
| 2,127,087 | 8/1938 | Mulholland | 65—342 |
| 3,241,937 | 3/1966 | Michalik et al. | 65—99 |
| 3,313,611 | 4/1967 | Keersmacecker | 65—99 |
| 3,326,652 | 6/1967 | Plumat | 65—99 |

S. LEON BASHORE, Primary Examiner

E. R. FREEDMAN, Assistant Examiner

U.S. Cl. X.R.

65—65, 99